United States Patent
Kuo et al.

(10) Patent No.: US 9,063,374 B2
(45) Date of Patent: Jun. 23, 2015

(54) BACKPLANE, BACKLIGHT MODULE USING THE SAME, AND LCD DEVICE

(75) Inventors: Yicheng Kuo, Shenzhen (CN); Yuchun Hsiao, Shenzhen (CN); Chong Huang, Shenzhen (CN); Jiahe Cheng, Shenzhen (CN); Chengwen Que, Shenzhen (CN); Quan Li, Shenzhen (CN); Liuyang Yang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 619 days.

(21) Appl. No.: 13/376,182

(22) PCT Filed: Dec. 2, 2011

(86) PCT No.: PCT/CN2011/083341
§ 371 (c)(1),
(2), (4) Date: Dec. 3, 2011

(87) PCT Pub. No.: WO2013/071658
PCT Pub. Date: May 23, 2013

(65) Prior Publication Data
US 2013/0128178 A1  May 23, 2013

(30) Foreign Application Priority Data
Nov. 18, 2011  (CN) .......................... 2011 1 0369617

(51) Int. Cl.
*H05K 5/00* (2006.01)
*G02F 1/1335* (2006.01)
*G02F 1/1333* (2006.01)

(52) U.S. Cl.
CPC .................. *G02F 1/133608* (2013.01); *G02F 2001/133314* (2013.01)

(58) Field of Classification Search
USPC .......................................... 361/753, 752, 755
See application file for complete search history.

(56) References Cited

U.S. PATENT DOCUMENTS 3,772,573 A * 11/1973 Triplett et al. ........... 361/679.01

FOREIGN PATENT DOCUMENTS

| CN | 2437004 Y | 6/2001 |
| CN | 2737129 Y | 10/2005 |

(Continued)

OTHER PUBLICATIONS

Yang Ting, the second office action, May 2013, CN.

(Continued)

*Primary Examiner* — Andargie M Aychillhum
(74) *Attorney, Agent, or Firm* — IPro, Inc.; Na Xu

(57) ABSTRACT

The present invention discloses a backplane, a backlight module using the same, and an LCD device, wherein the backplane comprises a main frame which comprises a plurality of brackets, and bridges which are arranged on the brackets and used for fixing PCBs; the bridges can rotate relative to the fixed points of the bridges to the brackets. In the present invention, because the backplane forms a frame structure through a plurality of brackets and the frame is provided with the bridges used for installing components such as PCBs and the like, both of the brackets and the bridges can be formed by combining universal shaping pieces; the manufacturing cost is lower; a large number of materials are saved. Simultaneously, the bridges can rotate relative to the fixed points of the bridges to the brackets, so that the positions of hillocks on the bridges can be adjusted when the bridges rotate; and then, the hillocks correspond to the locking points of the corresponding PCBs to satisfy the needs of the PCBs of different dimensions and enhance the universality of the backplane.

9 Claims, 7 Drawing Sheets

(56) References Cited

FOREIGN PATENT DOCUMENTS

| | | |
|---|---|---|
| CN | 101150942 A | 3/2008 |
| CN | 201115024 Y | 9/2008 |
| CN | 201331644 Y | 10/2009 |
| CN | 201672468 U | 12/2010 |
| CN | 101937263 A | 1/2011 |
| CN | 201845149 U | 5/2011 |
| CN | 202328070 U | 7/2012 |
| JP | 11-204931 A | 7/1999 |

OTHER PUBLICATIONS

Yang Ting, the first office action, Oct. 2012, CN.

Zhou Yu, the International Searching Authority written comments, Aug. 2012, CN.

* cited by examiner

BACKPLANE, BACKLIGHT MODULE USING THE SAME, AND LCD DEVICE

TECHNICAL FIELD

The present invention relates to the field of liquid crystal displays, and more particularly to a backplane, a backlight module using the same, and an LCD device.

BACKGROUND

Liquid crystal modules in limited production adopt integral backplanes. Generally, the backplanes are integrally formed in the mode of metal stamping or plastic injection, causing heavier products and higher material cost of the products. Larger stamping equipment is needed for larger products, the cost is higher, the corresponding die dimension is very large, the structure is complicated and the die cost is also very high. FIG. 1 shows a structural diagram of the existing backplane; the backplane is formed by integrally stamping the whole metal; hillocks 80 used for fixing PCBs are also stamped on the surface of the backplane; the backplane consumes a large number of materials and has larger weight and complicated processing courses. With increasingly fierce market competition, it is more and more important to effectively reduce the design cost. As a result, the key research direction of each designer lies in saving the material cost and simplifying the packaging technology. The design of hollowing or joining the backplane is developed on the existing integral design of the backplane; the cost is reduced to a certain extent; however, the strength of the backplane is reduced due to joining or hollowing, so that it is difficult to originally fix PCBs on the backplane.

The hillocks are the structures which are arranged on the backplane and used for fixing components such as PCBs and the like. In general, the hillocks protrude from the surface of the backplane; the PCBs are fixed to the hillocks through screws or other locking pieces, so as to avoid short-circuiting caused by the direct contact of the PCBs with the surface of the backplane. For the existing backplane as shown in FIG. 1, the hillocks 80 on the backplane are integrally stamped and formed on the backplane in making the backplane; in this way, the positions of the hillocks 80 on the backplane are fixed and are difficult to adapt to the PCBs of different dimensions. At the same time, for PCBs of different dimensions and the backlight module with different needs for the number of components, the die needs to be unloaded again for making a corresponding backplane; in accordance with the PCBs of different dimensions, the die needs to be unloaded for making a new backplane, so that the universality is poor and the production cost is higher in such a case.

SUMMARY

The aim of the present invention is to provide a backplane with material saving property and good universality, a backlight module using the same and an LCD device.

The purpose of the present invention is achieved by the following technical schemes. A backplane, comprising: a main frame which comprises a plurality of brackets, and bridges which are arranged on the brackets and used for fixing the PCBs; the bridges can rotate relative to the fixed points of the bridges to the brackets.

Preferably, the bridges are arranged on two adjacent or opposite brackets in pairs; the fixed ends of the bridges are connected to the brackets through the end hinges. Generally, the PCBs are locked through four angular points; thus, the bridges are arranged in pairs for corresponding to the angular points of the PCBs.

Preferably, the PCBs are fixed through at least four bridges arranged on the brackets. At least four bridges are used for fixing the PCBs so that the PCBs are locked on the backplane more reliably.

Preferably, the free ends of the two bridges arranged in pairs are connected through the tail hinges; the spacing between the hinging point and the fixed point of the free ends is adjustable. The bridges connected to the free ends can provide more steady support; simultaneously, the spacing between the hinging point and the fixed point of the free ends is adjustable, so as not to influence the selectivity of the bridges.

Preferably, the free ends of the two bridges arranged in pairs are provided with connecting grooves; the tail hinges penetrate through the connecting grooves of the two bridges; the tail hinges can slide in the connecting grooves. By installing the connecting grooves on the free ends, the tail hinges can slide in the connecting grooves so that the spacing between the hinging point and the fixed point of the free ends is adjustable without influence on the rotation of the bridges.

Preferably, the free ends of the two bridges arranged in pairs are provided with connecting grooves; the fixed ends arranged in pairs are also provided with installing cross grooves; the end hinges and the tail hinges respectively slide in the connecting grooves and the installing cross grooves. Both ends are provided with the grooves so that the hinges on both ends can slide in the grooves; therefore, the hillocks on the bridges can be adjusted in the horizontal direction and the vertical direction, so that the mobile zone of the hillocks is larger and the universality of the backplane is better.

Preferably, the bridges and the brackets are connected through screws. After the PCBs are locked, the screws are locked so that the bridges cannot rotate or slide, enhancing the reliability.

Preferably, the bridges and the brackets are connected through rivets. The hinges formed by rivet connection have higher reliability and are more convenient for setting.

A backlight module, comprising: the backplane.

An LCD device, comprising the backlight module.

In the present invention, because the backplane forms a frame structure through a plurality of brackets and the frame is provided with the bridges used for installing components such as PCBs and the like, both of the brackets and the bridges can be formed by combining universal shaping pieces; the manufacturing cost is lower; a large number of materials are saved. Simultaneously, the bridges can rotate relative to the fixed points of the bridges to the brackets, so that the positions of hillocks on the bridges can be adjusted when the bridges rotate; and then, the hillocks correspond to the locking points of the corresponding PCBs to satisfy the needs of the PCBs of different dimensions and enhance the universality of the backplane.

Wherein: 1. backplane; 100. frame; 111. upper bracket; 112. right bracket; 113. lower bracket; 114. left bracket; 115. central bracket; 120. bridge; 121. chute; 122. through hole; 124. end hinge; 125. tail hinge; 126. installing cross groove; 127. connecting groove; 800. hillock; 810. threaded hole; 811. screw; 812. nut; 820. rivet; 300. PCB.

DETAILED DESCRIPTION

Figure 1:
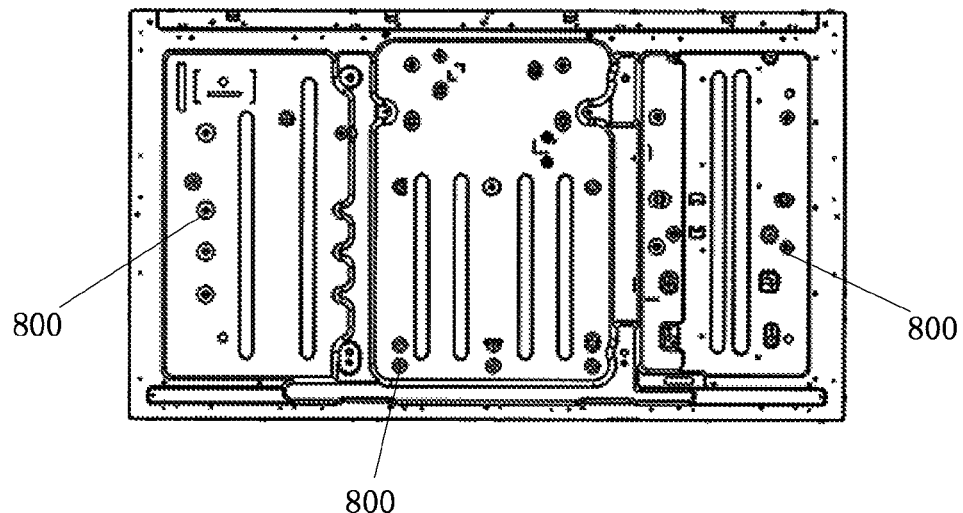
FIG. 1 is a structural diagram of the structure of the existing backplane.
Figure 2:
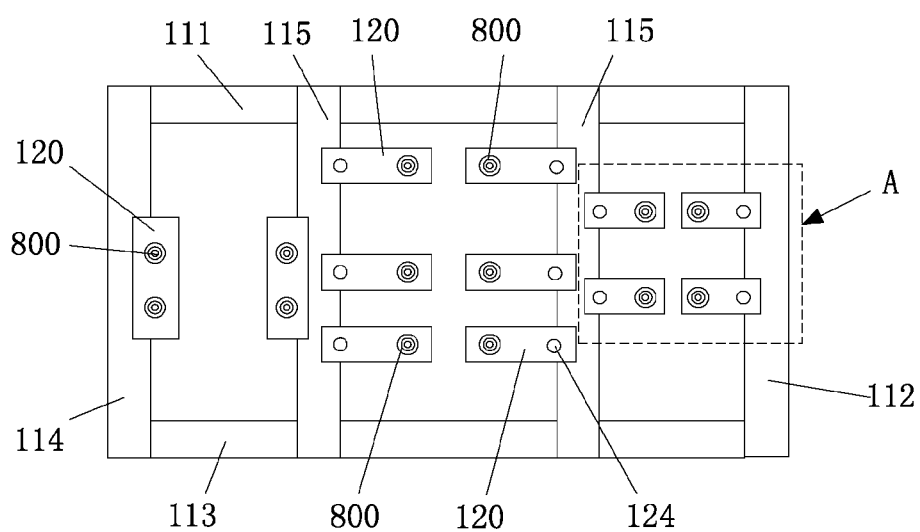
FIG. 2 is a structural diagram of a backplane of the first example of the present invention.

The present invention provides an LCD device, comprising: an LCD panel and a backlight module, wherein the bottom of the backlight module is provided with a backplane. The backplane comprises a frame which comprises a plurality of brackets; the frame is provided with a plurality of bridges. As shown in FIG. 2, the brackets comprise an upper bracket 111, a lower bracket 113, a left bracket 114 and a right bracket 112 which are placed end to end to form a large frame of the whole backplane; the large frame is also internally provided with two central brackets 115; both ends of the central brackets 115 are respectively fixed to the upper and the lower brackets. A plurality of bridges are arranged on each bracket and between two brackets; the bridges 120 can be used for fixing the PCBs and other components of the backlight module. The bridges 120 are provided with hillocks 800 used for locking the PCBs; moreover, the bridges can rotate relative to the fixed point of the bridges to the brackets.

For the scheme, the present invention will further be described in detail in accordance with the preferred examples.

Figure 3:
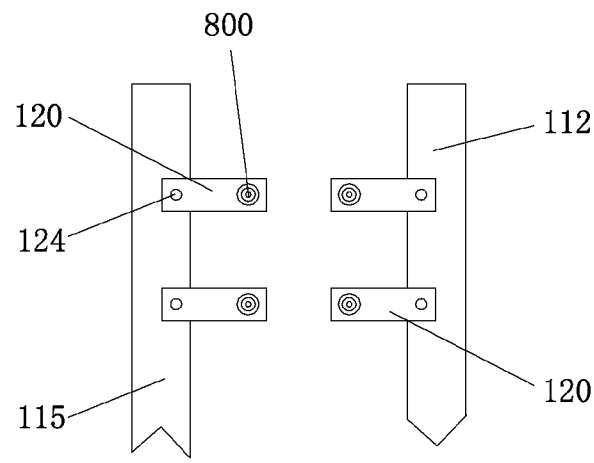
FIG. 3 is an amplification diagram of A of FIG. 2.
Figure 4:
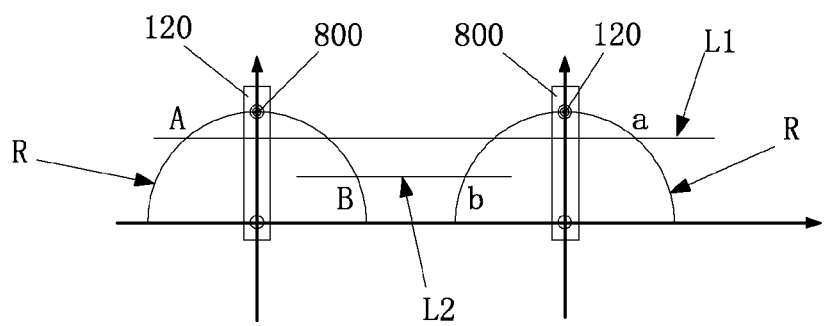
FIG. 4 is a trajectory analysis diagram of hillocks in the first example of the present invention.

FIG. 2 shows an example of the present invention; in the figure, A refers to the setting of a rotating bridge; FIG. 3 shows an amplification diagram of A; as shown in FIG. 3, the central brackets 115 and the right bracket 112 are provided with totally four bridges 120 arranged in opposite; the fixed ends of the bridges 120 are respectively connected with the central brackets 115 and the right bracket 112 through the end hinges 124; in this way, the bridges 120 can rotate relative to the fixed points of the bridges 120 to the brackets (i.e. the end hinges 124). FIG. 4 is a running trajectory diagram of hillocks 800 on the two bridges 120 on the right bracket 112; in the figure, the circular arcs R indicate running tracks of the hillocks 800; straight lines L1 and L2 refer to the connecting lines of the fixed points of PCBs of different dimensions; as shown in the figure, the intersection points of the straight line L1 with the curves R are the positions of the fixed points A and a of PCB; the intersection points of the straight line L2 with the curves R are the positions of the fixed points B and b of another PCB, namely, the locking positions of PCBs of two specifications in the positions of the fixed points A, a, B and b are provided in a rotatable track of the hillocks 800 on the bridges 120. Therefore, in the scheme, the running track of the corresponding hillocks 800 can be set according to the PCBs of different dimensions, and the installation of multiple PCBs of different dimensions can be satisfied, so as to improve the universality of the backplane.

Figure 5:
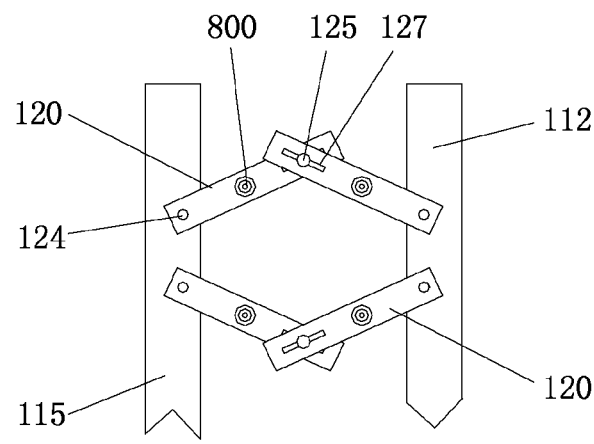
FIG. 5 is another structural form of the first example of the present invention.
Figure 6:
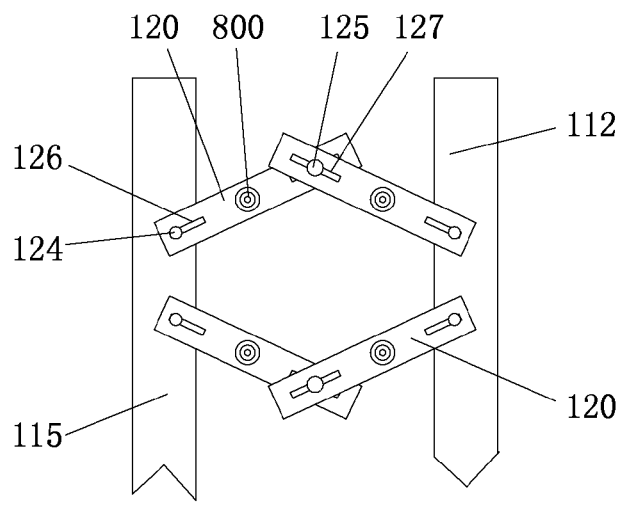
FIG. 6 is the third structural form of the first example of the present invention.

In addition, as shown in FIG. 5, in order to improve the supporting strength of the bridges 120, the free ends of two opposite bridges 120 can be connected through tail hinges 125 and connecting grooves 127 can be arranged in the connecting positions so that the tail hinges 125 can slide on the connecting grooves without blocking the rotation of the bridges 120; correspondingly, as shown in FIG. 6, the fixed ends of the bridges 120 are also provided with cross grooves 126 so that the end hinges 124 can also slide in the cross grooves 126; in this way, the whole of bridges 120 can slide relative to the end hinges 124 so that the mobile track of the hillocks 800 on the bridges 120 is not limited to the track of the circular arc as shown in FIG. 4 but is a larger region, improving the universality of the backplane.

In order to obtain a larger mobile range of the hillocks according to the scheme in the example, the bridges can also be provided with chutes or through holes or the hillocks existing as individual parts can be used.

Figure 7:
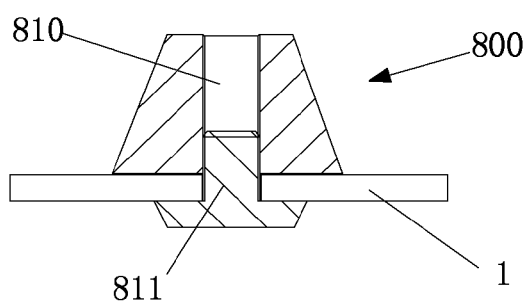
FIG. 7 is a hillock structure of the second and the third examples of the present invention.
Figure 9:
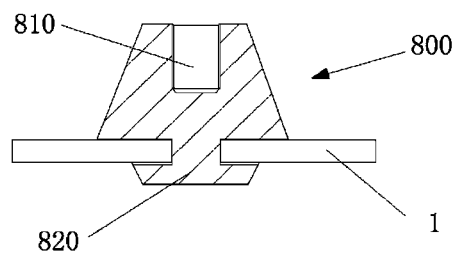
FIG. 9 is another hillock structure of the second and the third examples of the present invention.

FIGS. 7 and 9 show the hillocks 800 existing as independent parts in the example of the present invention; the hillocks 800 are not formed on the backplane in producing the backplane but installed in the relevant positions of the backplane 1 in needing to use the hillocks so as to achieve the purpose of flexibly using the hillocks 800 to locate the components of various dimensions of PCBs and the like.

Figure 8:
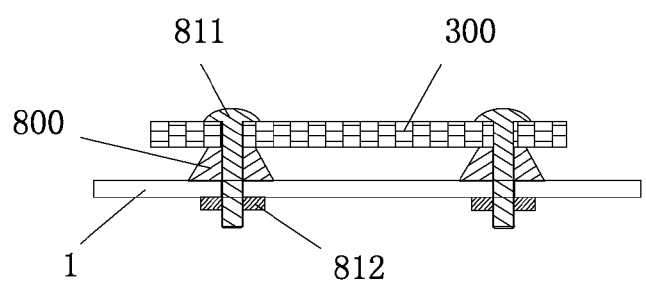
FIG. 8 is a diagram of locking PCBs through hillocks in the second and the third examples of the present invention.

As shown in FIG. 7, the hillock 800 is provided with the threaded hole 810 used for installing and fixing the components of PCBs and the like; the threaded hole 810 always penetrates through the independent hillock 800 so that the independent hillock 800 can be fixed to the backplane 1 from below through a screw 811; at the same time, the PCB can be fixed from above; correspondingly, the backplane 1 shall be provided with hillock installing holes with the equivalent size to the threaded hole 810 of the hillock 800, such as through holes or chutes, so that the hillock 800 can be fixed to the backplane 1. Similarly, only one screw can also be used for matching the nut to achieve the fixation among the PCB, the hillock and the backplane; as shown in FIG. 8, because the threaded hole penetrates through the whole hillock 800, only one screw 811 can be matched with the nut 812 for directly locking the PCB 300 to the backplane 1.

Figure 10:
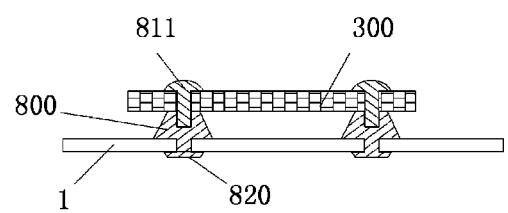
FIG. 10 is another diagram of locking PCBs through hillocks in the second and the third examples of the present invention.

In order to facilitate installation, as shown in FIG. 9, the bottom of the hillock can be set into a similar structure to the rivet, namely the rivet and the hillock are integrally formed; the connection of the lower part of the hillock 800 with the backplane 1 is in a riveting form, namely the hillock 800 is riveted to the backplane 1 through the rivet 820. The riveting mode is quicker than the screwed connection mode, can be finished through a machine, and improves the production efficiency. As shown in FIG. 10, the hillock 800 is fixed to the backplane 1 through the rivet 820; then, the PCB 300 is fixed to the hillock through the screw 811 for finishing locking the PCB 300.

Figure 11:
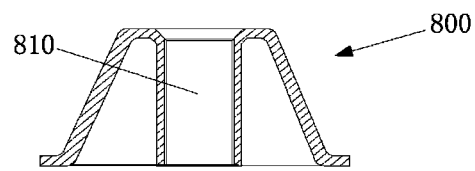
FIG. 11 is a structure of the third hillock in the second and the third examples of the present invention.

In order to save the material and facilitate the processing, the hillock can be formed by directly stamping through a plate; as shown in FIG. 11, the inner part of the hillock 800 is a hollow structure; the whole hillock 800 is made of a plate material, which saves the material and facilitates the production. Certainly, the shape of the independent hillock 800 in the example is not limited to the conical section shape shown in the figure; the corresponding purpose can also be achieved relative to other shapes such as square.

Figure 12:
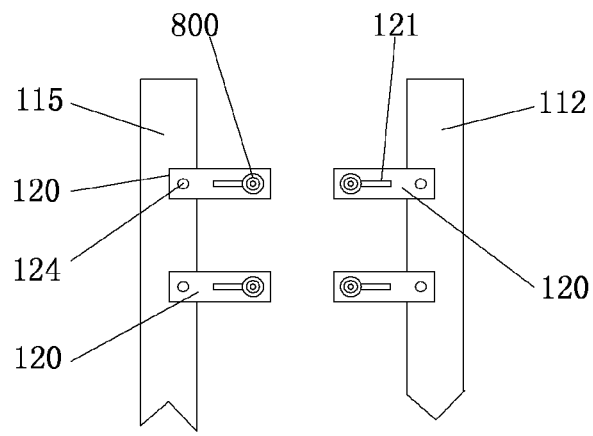
FIG. 12 is a structural diagram of the second example of the present invention.
Figure 13:
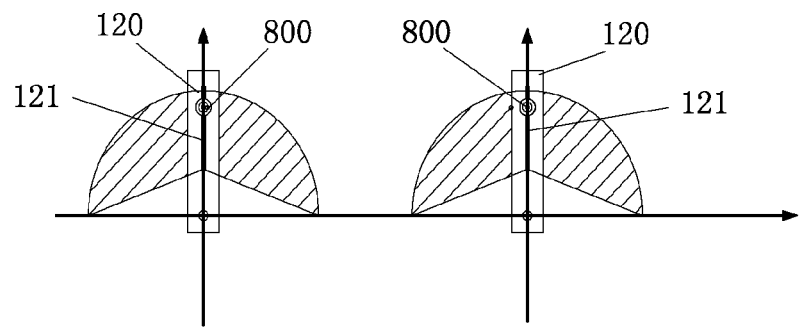
FIG. 13 is a trajectory analysis diagram of hillocks of the second example of the present invention.

FIG. 12 shows the second example of the present invention; the difference between the second example and the first example is in that the bridges 120 are provided with chutes 121 which are provided with hillocks 800 existing as individual parts; the hillocks 800 can be arranged in the relevant positions on the chutes 121 as required. FIG. 13 shows the analysis of the mobile positions of the hillocks 800; the shaded portions shown in the figure (i.e. gradient-filled parts) are the mobile regions of the hillocks 800. Or, with the rotation of the bridges 120 and the movement of the hillocks 800 on the chutes 121, the setting positions of the hillocks 800 are the regions of the shaded portions shown in the figure; in this way, the corresponding rotating positions of the bridges 120 and the length of the chutes 121 are set according to different dimensions of PCBs so that the shaded portions cover the locking points of various PCBs and the backplane can adapt to various dimensions of PCBs.

Figure 14:
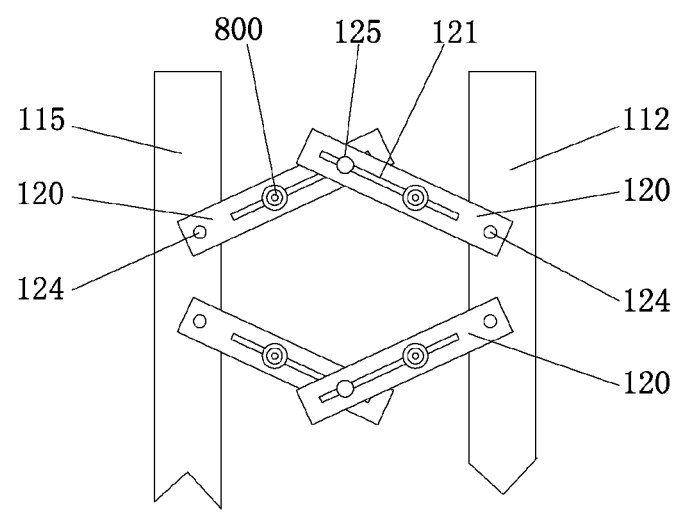
FIG. 14 is another structural form of the second example of the present invention.

In addition, in order to improve the supporting strength of the bridges, the free ends of two opposite bridges shall be connected and connecting grooves shall be arranged for installing the hinges so that the bridges still can rotate. As shown in FIG. 14, in order to facilitate the processing, when the chutes 121 are processed, the length of the chutes 121 is extended so that the chutes 121 replace the connecting grooves for functions.

Figure 15:
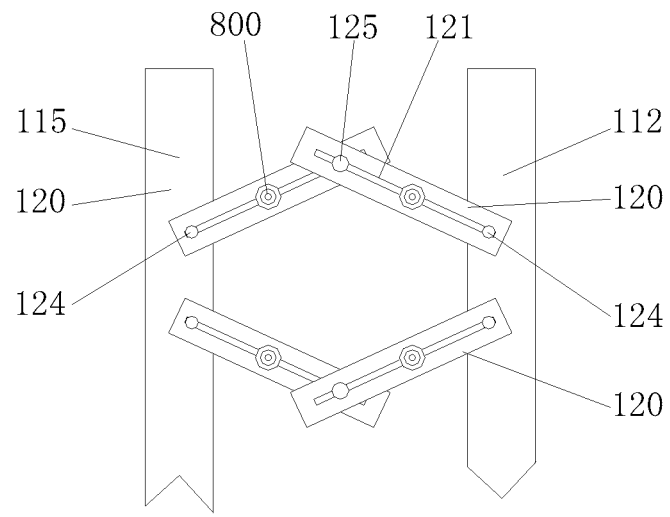
FIG. 15 is the third structural form of the second example of the present invention.

Certainly, the end hinges on the fixed ends can also be provided with corresponding installing cross grooves so that the bridges can slide relative to the end hinges; moreover, the installing cross grooves can also be processed in processing the chutes, namely the chutes replace the cross grooves for functions; as shown in FIG. 15, the chutes 121 extend to the connecting positions of the fixed ends.

Figure 16:
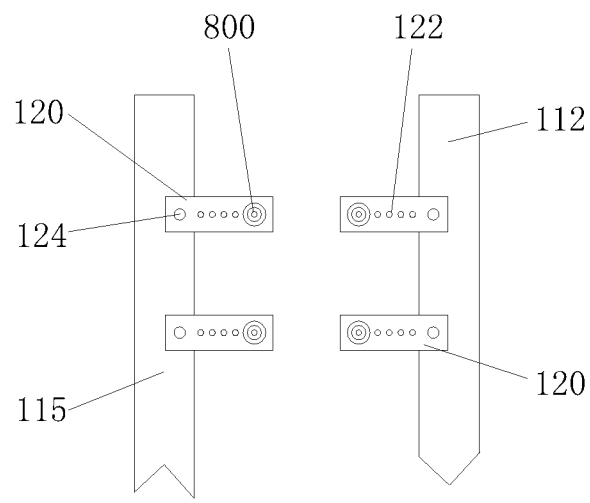
FIG. 16 is the third example of the present invention.
Figure 17:
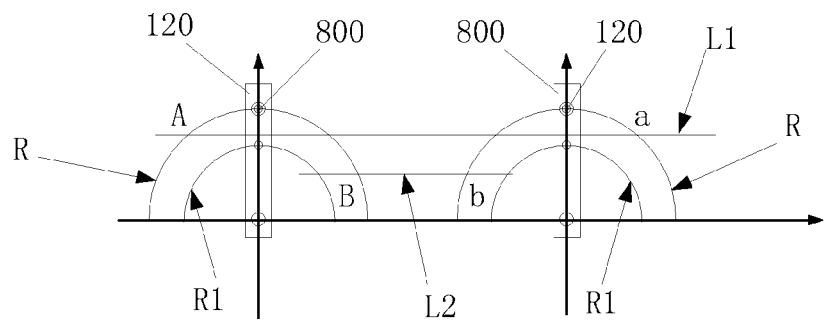
FIG. 17 is a trajectory analysis diagram of hillocks of the third example of the present invention.

FIG. 16 shows the third example of the present invention; the difference between the third example and the second example is in that the bridges 120 are provided with through holes 122 which are provided with hillocks 800 existing as individual parts; the hillocks 800 can be arranged on the through holes 122 of the relevant positions as required. FIG. 17 shows the analysis of the mobile positions of the hillocks 800; the circular arcs R in the figure indicate the mobile tracks of the hillocks 800 on the through hole 122 of a certain position; the circular arcs R1 indicate the mobile tracks of the hillocks 800 on the through hole 122 of another position; similarly, different mobile tracks will be generated when the hillocks 800 are on the through holes 122 of different positions. In this way, by arranging the through holes 122 on the bridges 120, larger mobile tracks of the hillocks 800 can also be obtained, namely the corresponding rotating positions of the bridges 120 and the positions and the number of the through holes 122 are set according to different dimensions of PCBs so that the mobile tracks of the hillocks 800 cover the locking points of various PCBs and the backplane can adapt to various dimensions of PCBs.

Figure 18:
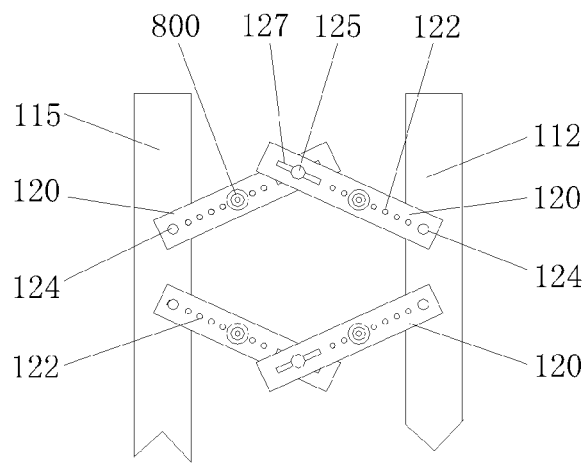
FIG. 18 is another structural form of the third example of the present invention.
Figure 19:
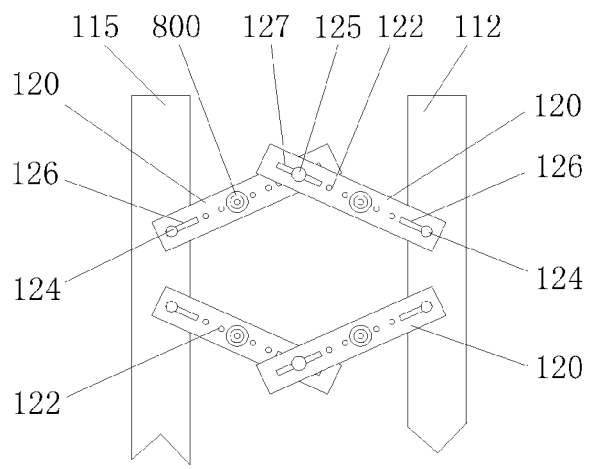
FIG. 19 is the third structural form of the third example of the present invention.

As shown in FIG. 18, similar to the second example, in order to improve the supporting strength of the bridges 120, the free ends of two opposite bridges 120 shall be connected and connecting grooves 127 shall be arranged for installing the tail hinges 125 so that the bridges still can rotate. As shown in FIG. 19, the end hinges 124 on the fixed ends can also be provided with corresponding installing cross grooves 126 so that the bridges can slide relative to the end hinges for obtaining better mobile regions of the hillocks.

In several examples of the present invention, the hinge connection among the bridges and the brackets and among the bridges can be conducted through screws or rivets; the screws can be locked in the screw mode after finishing locking the PCBs, improving the stability of the screws; the connecting reliability can be improved by using the rivets.

The present invention is described in detail in accordance with the above contents with the specific preferred examples. However, this invention is not limited to the specific examples. For the ordinary technical personnel of the technical field of the present invention, on the premise of keeping the conception of the present invention, the technical personnel can also make simple deductions or replacements, and all of which should be considered to belong to the protection scope of the present invention.

We claim:

1. A backplane, comprising: a main frame which comprises a plurality of brackets, and bridges which are arranged on said brackets and used for fixing PCBs on the backplane; a plurality of fixed points are defined on the backplane for fixing the bridges to said brackets, and said bridges rotate relative to fixed points of the bridges to said brackets along a vertical direction; wherein said bridges are arranged on two adjacent or opposite brackets in pairs; fixed ends of said bridges are connected to the brackets through end hinges defined on the backplane; wherein free ends of said two bridges on the backplane arranged in pairs are connected through tail hinges defined on the backplane; each spacing defined between the hinging point and the fixed point of said free ends is adjustable.

2. The backplane of claim 1, wherein the PCBs are fixed through at least four bridges arranged on said brackets.

3. The backplane of claim 1, wherein the free ends of said two bridges arranged in pairs are provided with connecting grooves; the fixed ends arranged in pairs are also provided with installing cross grooves; said end hinges and said tail hinges respectively slide in said connecting grooves and the installing cross grooves.

4. A backplane module, comprising: a backplane comprises a main frame which comprises a plurality of brackets, and bridges which are arranged on said brackets and used for fixing PCBs on the backplane; a plurality of fixed points are defined on the backplane for fixing the bridges to said brackets, and said bridges rotate relative to fixed points of the bridges to said brackets along a vertical direction, wherein said bridges are arranged on two adjacent or opposite brackets in pairs; the fixed ends of said bridges are connected to the brackets through end hinges defined on the backplane, wherein, the free ends of said two bridges on the backplane arranged in pairs are connected through tail hinges defined on the backplane; each spacing defined between the hinging point and the fixed point of said free ends is adjustable.

5. The backlight module of claim 4, wherein said PCBs are fixed through at least four bridges arranged on said brackets.

6. The backlight module of claim 4, wherein the free ends of said two bridges arranged in pairs are provided with connecting grooves; said fixed ends arranged in pairs are also provided with installing cross grooves; said end hinges and said tail hinges respectively slide in said connecting grooves and the installing cross grooves.

7. An LCD device, comprising a backplane comprises a main flame which comprises a plurality of brackets, and bridges which are arranged on said brackets and used for fixing PCBs on the backplane; a plurality of fixed points are defined on the backplane for fixing the bridges to said brackets, and the bridges rotate relative to fixed points of the bridges to the brackets along a vertical direction, wherein, said bridges are arranged on two adjacent or opposite brackets in pairs; the fixed ends of said bridges are connected to the brackets through end hinges defined on the backplane, wherein said PCBs are fixed through at least four bridges arranged on said brackets, wherein, the free ends of said two bridges on the backplane arranged in pairs are connected through tail hinges defined on the backplane; each spacing defined between the hinging point and the fixed point of said flee ends is adjustable.

8. The LCD device of claim 7, wherein said PCBs are fixed through at least four bridges arranged on said brackets.

9. The LCD device of claim 7, wherein the free ends of said two bridges arranged in pairs are provided with connecting grooves; said fixed ends arranged in pairs are also provided with installing cross grooves; said end hinges and said tail hinges respectively slide in said connecting grooves and the installing cross grooves.

* * * * *